US011021798B2

(12) United States Patent
Park et al.

(10) Patent No.: US 11,021,798 B2
(45) Date of Patent: Jun. 1, 2021

(54) WATER DECOMPOSITION DEVICE AND METHOD OF MANUFACTURING THE SAME

(71) Applicants: Hyundai Motor Company, Seoul (KR); Kia Motors Corporation, Seoul (KR); UNIST (ULSAN NATIONAL INSTITUTE OF SCIENCE AND TECHNOLOGY), Ulsan (KR)

(72) Inventors: Jang-Su Park, Busan (KR); Hee-Jun Kim, Ulsan (KR); Tae-Won Lee, Ulsan (KR); Jeong Min Baik, Ulsan (KR)

(73) Assignees: Hyundai Motor Company, Seoul (KR); Kia Motors Corporation, Seoul (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 126 days.

(21) Appl. No.: 16/169,709

(22) Filed: Oct. 24, 2018

(65) Prior Publication Data
US 2020/0063271 A1    Feb. 27, 2020

(30) Foreign Application Priority Data

Aug. 21, 2018 (KR) .................. 10-2018-0097437

(51) Int. Cl.
| | |
|---|---|
| C25B 9/06 | (2006.01) |
| C25B 1/04 | (2021.01) |
| C25B 11/02 | (2021.01) |
| F21S 45/33 | (2018.01) |
| C01B 3/06 | (2006.01) |
| C25B 9/17 | (2021.01) |

(52) U.S. Cl.
CPC ................ C25B 1/04 (2013.01); C01B 3/068 (2013.01); C25B 9/17 (2021.01); C25B 11/02 (2013.01); F21S 45/33 (2018.01)

(58) Field of Classification Search
CPC .. C25B 1/04; C25B 11/02; C25B 9/06; C25B 9/18; C25B 1/06; C25B 9/00; C25C 7/02; C25C 7/00; C25C 3/08
See application file for complete search history.

(56) References Cited

U.S. PATENT DOCUMENTS

2007/0212665 A1\*  9/2007  Jimenez .................. A61C 17/00
                                                                433/215
2015/0034479 A1\*  2/2015  Pan ........................... C25B 9/20
                                                                204/277

FOREIGN PATENT DOCUMENTS

JP          2012188683       \* 10/2012  ............... C25B 9/00

\* cited by examiner

*Primary Examiner* — Zulmariam Mendez
(74) *Attorney, Agent, or Firm* — Morgan, Lewis & Bockius LLP (57) ABSTRACT

A water decomposition device may include a hydrogen-generating electrode including a first external electrode and at least one first internal electrode formed integrally with the first external electrode, and an oxygen-generating electrode including a second external electrode and at least one second internal electrode formed integrally with the second external electrode. The first external electrode and the second external electrode are disposed to face each other, and the first internal electrode and the second internal electrode are disposed alternately in a direction perpendicular to the longitudinal direction thereof. Therefore, the water decomposition device may secure both transparency and durability even when an opaque material is used therefor.

27 Claims, 5 Drawing Sheets

WATER DECOMPOSITION DEVICE AND METHOD OF MANUFACTURING THE SAME

CROSS-REFERENCE TO RELATED APPLICATION

The present application claims priority to Korean Patent Application No. 10-2018-0097437, filed on Aug. 21, 2018 with the Korean Intellectual Property Office, the entire contents of which is incorporated herein for all purposes by this reference.

BACKGROUND OF THE INVENTION

Field of the Invention

The present invention relates to a water decomposition device and a method of manufacturing the same, and more particularly to a water decomposition device including a hydrogen-generating electrode and an oxygen-generating electrode and to a method of manufacturing the same.

Description of Related Art

A vehicle headlamp is designed to illuminate an area in front of the vehicle. Such a headlamp must have sufficient light distribution capability for safe driving. However, while the vehicle is operating, a great temperature difference occurs between the inside and the outside of the headlamp. Particularly, in a high-humidity environment, for example, during the rainy season or in a vehicle wash, the headlamp is covered with mist due to moisture introduced thereinto, whereby the light distribution capability of the headlamp is reduced to less than half.

As a method of solving the present problem, application of a hydrophilic material on the surface of a lens may be considered. However, the hydrophilic coating layer has a relatively short lifespan, stains easily after use, and incurs relatively high costs.

It is also possible to consider the use of a moisture absorbent including acrylic acid polymer (AAP), silicon, alumina-based zeolite, etc. However, in a high-humidity environment, such a moisture absorbent cannot be reused, and may deteriorate the light distribution capability of the headlamp due to the low transparency of the porous material.

The use of a heat-exchanging system or an air-conditioning system may also be considered. However, when a heat-exchanging system or an air-conditioning system is used alone, it does not exhibit a sufficient effect compared to the amount of energy and costs that are required for the system. Moreover, when the two systems are used together, the structure may become complicated.

In the case of a water decomposition technology using a hydrogen separator, there is a problem with bonding because it utilizes a polymer separator. Thus, it is difficult to apply catalytic materials other than a precious metal such as platinum (Pt), iridium (Ir) or the like. Furthermore, it is difficult to secure transparency of the structure thereof, and durability is also poor.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a water decomposition device which may secure both transparency and durability even when an opaque material is used therefor.

In accordance with an aspect of the present invention, the above and other objects may be accomplished by the provision of a water decomposition device including a hydrogen-generating electrode including a first external electrode and at least one first internal electrode formed integrally with the first external electrode, and an oxygen-generating electrode including a second external electrode and at least one second internal electrode formed integrally with the second external electrode, wherein the first external electrode and the second external electrode are disposed to face each other, and the first internal electrode and the second internal electrode are disposed alternately in a direction perpendicular to the longitudinal direction thereof.

The first internal electrode and the second internal electrode may be spaced from each other by an interval of 10 to 500 μm.

At least one of the first external electrode, the first internal electrode, the second external electrode or the second internal electrode may have at least one hole formed therein.

The hole may have a circular shape.

The hole may have a diameter which is 80 to 95% of the width of a corresponding one of the first external electrode, the first internal electrode, the second external electrode and the second internal electrode.

Each of the first external electrode, the first internal electrode, the second external electrode and the second internal electrode may have a width of 100 μm or less.

The diameter of the hole may be 80 to 95 μm.

A hole may have a regular polygonal shape, and the regular polygonal hole may have the same area as the circular hole.

The at least one hole formed in a corresponding one of the first external electrode, the first internal electrode, the second external electrode and the second internal electrode may include two or more holes.

The holes may be formed such that the centers thereof are aligned with the center of a width of a corresponding one of the first external electrode, the first internal electrode, the second external electrode and the second internal electrode.

When the holes have the same diameter as each other, the shortest distance from the center of one hole to another hole may be equal to a length equivalent to half the width of a corresponding one of the first external electrode, the first internal electrode, the second external electrode and the second internal electrode.

The shortest distance may be 50 μm or less.

At least one of the hydrogen-generating electrode or the oxygen-generating electrode may include a substrate, an electrode layer formed on the substrate, and a catalyst layer electrodeposited on the electrode layer.

The substrate may be made of at least one selected from the group consisting of polyethylene terephthalate, polyethylene naphthalate, and polydimethylsiloxane.

The electrode layer may be made of at least one selected from the group consisting of nickel, titanium, copper, iron, aluminum, stainless steel, indium tin oxide (ITO), and fluorinated tin oxide (FTO).

The electrode layer may have a thickness which is less than a skin depth with respect to a visible light frequency range.

The catalyst layer may be made of at least one selected from the group consisting of nickel, nickel oxide, nickel sulfide, nickel-copper phosphide, platinum, iridium, and rubidium.

The catalyst layer may have a thickness which is greater than 150 nm and less than 5 μm.

In accordance with another aspect of the present invention, there is provided a method of manufacturing a water decomposition device, the method including forming a predetermined pattern on at least one of a first substrate or a second substrate using any one of photoresist lithography and nanoimprint lithography, forming a metal layer on at least one of the first substrate or the second substrate that has the pattern thereon, and electrodepositing a catalyst layer on the metal layer.

The predetermined pattern may include a first external line and at least one first internal line formed integrally with the first external line, the first external line and the first internal line being formed on the first substrate, and a second external line and at least one second internal line formed integrally with the second external line, the second external line and the second internal line being formed on the second substrate, wherein the first external line and the second external line face each other, and the first internal line and the second internal line are disposed alternately in a direction perpendicular to the longitudinal direction thereof.

The first internal line and the second internal line may be spaced from each other by an interval of 10 to 500 μm.

At least one of the first external line, the first internal line, the second external line or the second internal line may have at least one hole formed therein.

The hole may have a circular shape.

The hole may have a diameter which is 80 to 95% of a width of a corresponding one of the first external line, the first internal line, the second external line and the second internal line.

A hole may have a regular polygonal shape, and the regular polygonal hole may have the same area as the circular hole.

The at least one hole formed in a corresponding one of the first external line, the first internal line, the second external line and the second internal line may include two or more holes.

The holes may be formed such that the centers thereof are aligned with the center of a width of a corresponding one of the first external line, the first internal line, the second external line and the second internal line.

When the holes have the same diameter as each other, the shortest distance from the center of one hole to another hole may be equal to a length equivalent to half the width of a corresponding one of the first external line, the first internal line, the second external line and the second internal line.

The metal layer may have a thickness which is less than a skin depth with respect to a visible light frequency range.

The catalyst layer may have a thickness which is greater than 150 nm and less than 5 μm.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Figure 1:
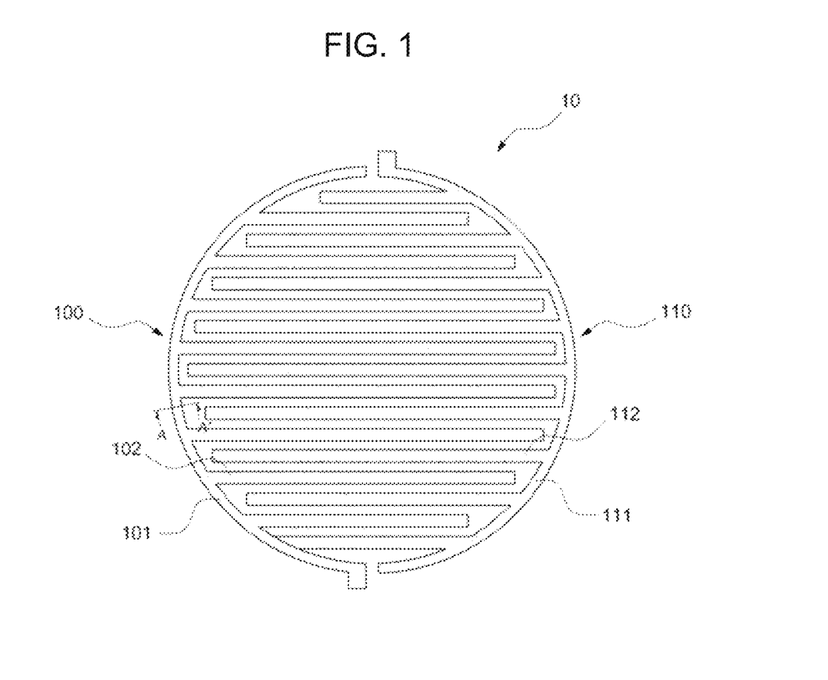
FIG. 1 is a view showing the configuration of a water decomposition device according to an exemplary embodiment of the present invention.

FIG. 1 is a view showing the configuration of a water decomposition device according to an exemplary embodiment of the present invention. Referring to FIG. 1, a water decomposition device 10 in an exemplary embodiment of the present invention may include a hydrogen-generating electrode 100 and an oxygen-generating electrode 110. The hydrogen-generating electrode 100 may include a first external electrode 101 and at least one first internal electrode 102 formed integrally with the first external electrode 101. The oxygen-generating electrode 110 may include a second external electrode 111 and at least one second internal electrode 112 formed integrally with the second external electrode 111. The first external electrode 101 and the second external electrode 111 may be disposed to face each other, and the first internal electrode 102 and the second internal electrode 112 may be disposed alternately in a direction perpendicular to the longitudinal direction thereof.

The shape of the first external electrode 101 or the second external electrode 111 may vary depending on the position at which the first external electrode 101 or the second external electrode 111 is attached within the headlamp. The attachment position may be located in a region where moisture may remain after being generated within the head lamp, and may vary depending on the type of vehicle. For example, the first external electrode 101 or the second external electrode 111 may have a semicircular shape or a U-shape, or may have the same shape as the lateral end portion of the headlamp.

The alternate arrangement of the first internal electrode 102 and the second internal electrode 112 means that the hydrogen-generating electrode 100 and the oxygen-generating electrode 110 are disposed alternately, more specifically, means that the water decomposition device 10 has a repeating structure in which the first internal electrode 102 and the second internal electrode 112 are grouped into a single repeating device.

The internal electrode, located at the uppermost position in the water decomposition device 10, may be the first internal electrode 102 or the second internal electrode 112. For example, the first internal electrode 102, which is formed integrally with the first external electrode 101 and is located at the uppermost position of the first external electrode 101, may be located at a higher position than the second internal electrode 112, which is formed integrally with the second external electrode 111 and is located at the uppermost position of the second external electrode 111. The first internal electrode 102 and the second internal electrode 112 form a repeating unit (hereinafter, referred to as a "first repeating unit"), in which the first internal electrode 102 is located at an upper position and the second internal electrode 112 is located under the first internal electrode 102.

On the other hand, the second internal electrode 112, which is formed integrally with the second external electrode 111 and is located at the uppermost position of the second external electrode 111, may be located at a higher position than the first internal electrode 102, which is formed integrally with the first external electrode 101 and is located at the uppermost position of the first external electrode 101. The second internal electrode 112 and the first internal electrode 102 form a repeating unit (hereinafter, referred to as a "second repeating unit"), in which the second internal electrode 112 is located at an upper position and the first internal electrode 102 is located under the second internal electrode 112.

The number of repetitions of the repeating unit may be set in consideration of the transmittance and the water decomposition capability of the water decomposition device. The number of repetitions may be n (n being a natural number), or may be n+0.5. The configuration in which the number of repetitions is n+0.5 means that the internal electrode located at the bottom portion of the water decomposition device is the internal electrode located at the top portion of the repeating unit.

For example, in the case in which the repeating unit is the first repeating unit, the internal electrode located at the bottom portion of the water decomposition device 10 is the first internal electrode 102. In the case in which the repeating unit is the second repeating unit, the internal electrode located at the bottom portion of the water decomposition device 10 is the second internal electrode 112.

The interval between the first internal electrode 102 and the second internal electrode 112 may be 10 to 500 μm. In the case in which the interval between the first internal electrode 102 and the second internal electrode 112 exceeds 500 μm, it is difficult to cause water to be decomposed to contact both the first internal electrode 102 and the second internal electrode 112 at the same time, with the result that the decomposition of water may be realized only in a specific region, for example, in a region in which the size or diameter of water droplet exceeds 500 μm. In the case in which the interval is less than 10 μm, bubbles generated during the decomposition of water may block the gap between the electrodes and thus may cause malfunction of the water decomposition device.

Decomposition of water may also occur between the first external electrode 101 and the second internal electrode 112 or between the second external electrode 111 and the first internal electrode 102. As described above, the interval between the electrodes may be set in consideration of uniform water decomposition and bubble generation prevention, and may preferably be 10 to 500 μm.

Figure 2:
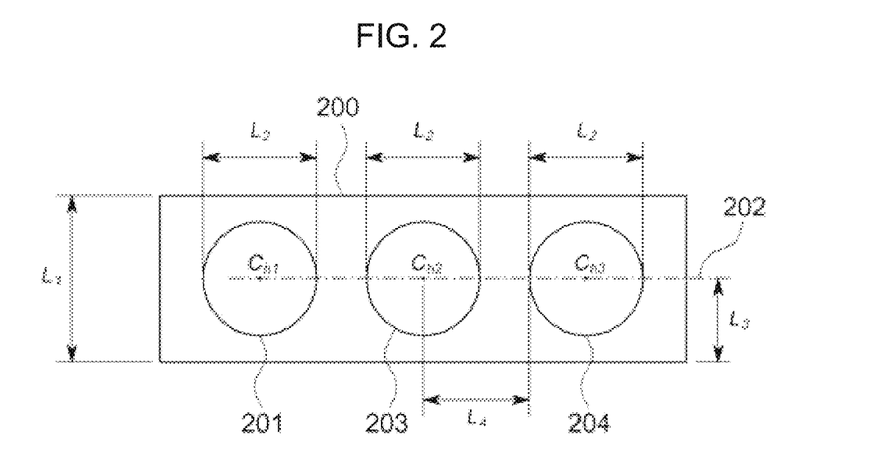
FIG. 2 is a view showing a circular hole formed in an electrode according to an exemplary embodiment of the present invention.

FIG. 2 is a view showing a circular hole formed in an electrode according to an exemplary embodiment of the present invention. Referring to FIG. 2, at least one hole 201 may be formed in the electrode 200. Here, the electrode 200 refers to at least one of the first external electrode 101, the first internal electrode 102, the second external electrode 111 or the second internal electrode 112. The hole 201 may preferably have a circular shape. However, the present invention is not limited thereto. The hole 201 may have a regular polygonal shape, which is symmetrical even when rotated at 90 degrees, for example, a square shape.

The diameter $L_2$ of the hole may be 80 to 95% of the width $L_1$ of the electrode. As the diameter $L_2$ of the hole increases, the transmittance of the light emitted from the headlamp increases, but the area of the electrode 200 in which water is decomposed decreases. In the case in which the diameter $L_2$ of the hole is less than 80% of the width $L_1$ of the electrode, the light transmittance may be reduced to less than 70%. In the case in which the diameter $L_2$ of the hole exceeds 95% of the width $L_1$ of the electrode, the water decomposition capability and the durability of the water decomposition device may be lowered. Here, the durability of the device means the ability to be used without being detached from the headlamp or getting damaged at a high voltage.

Therefore, the diameter $L_2$ of the hole would be 80 to 95% of the width $L_1$ of the electrode in consideration of light transmittance and the water decomposition capability of the water decomposition device. For example, when the width $L_1$ of the electrode is 100 μm, the diameter $L_2$ of the hole may be 80 to 95 μm. On the other hand, in the case in which the hole has a regular polygonal shape rather than a circular shape, the regular-polygonal hole may be formed to have the same area as the circular hole.

At least two holes may be formed in a single electrode 200, and the centers of the holes may be aligned with the center of the width of the electrode. The centers $C_{h1}$, $C_{h2}$ and $C_{h3}$ of the holes may be located in a line 202 (hereinafter, referred to as a center line), which connects points that are spaced from one side of the electrode in the width direction thereof by a length $L_3$ equivalent to half the width of the electrode.

In the case in which the diameters $L_2$ of the holes are the same as each other, the shortest distance $L_4$ from the center $C_{h2}$ of one hole 203 to another hole 204, i.e., the distance obtained by subtracting the radius of the hole 204 from the straight-line distance between the centers $C_{h2}$ and $C_{h3}$ located in the center line 202, may be equal to the length $L_3$ equivalent to half the width of the electrode. For example, in the case in which two holes, each having a diameter of 80 µm, are formed in the center of an electrode having a width of 100 µm, the shortest distance from the center of one hole to another hole may be 50 µm. The shortest distance from the center $C_{h1}$ of the hole 201 to the hole 203 may also be equal to the length $L_3$ equivalent to half the width of the electrode, as described above.

The positions of the centers of the holes, the number of holes, the diameters of the holes, the intervals between the holes, and the like may preferably be determined in consideration of the water decomposition capability and light transmittance of the water decomposition device. However, the present invention is not limited thereto.

Figure 3:
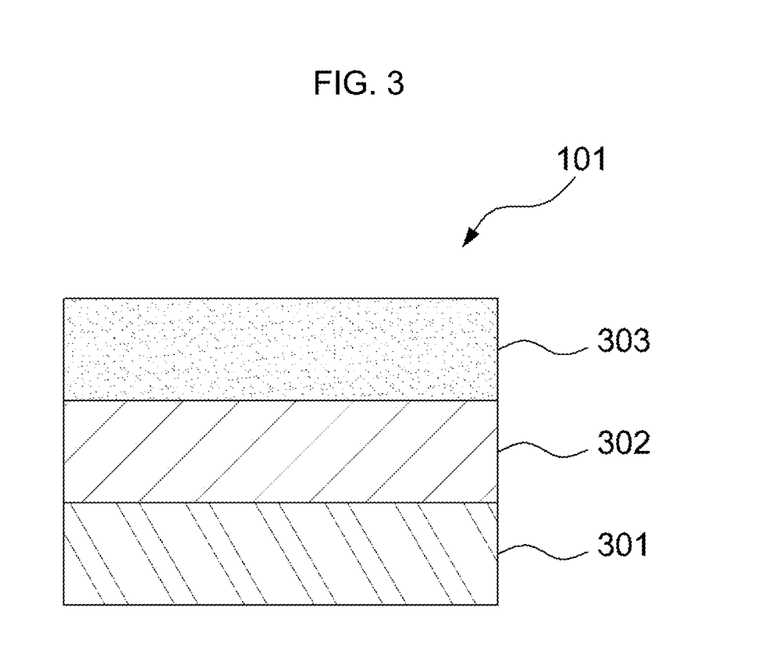
FIG. 3 is a sectional view of a first external electrode taken along line A-A' in FIG. 1.

FIG. 3 is a sectional view of the first external electrode 101 taken along line A-A' in FIG. 1. Referring to FIG. 3, the first external electrode 101 may include a substrate 301, an electrode layer 302 formed on the substrate 301, and a catalyst layer 303 electrodeposited on the electrode layer 302. The present sectional structure of the first external electrode 101 may be the same as that of the first internal electrode 102, the second external electrode 111 or the second internal electrode 112.

The substrate 301 may be made of at least one selected from the group consisting of polyethylene terephthalate, polyethylene naphthalate, and polydimethylsiloxane. However, the present invention is not limited thereto. The substrate 301 may be formed to be transparent and flexible, specifically, may include a transparent and flexible polymer film.

The electrode layer 302 may be made of at least one selected from the group consisting of nickel, titanium, copper, iron, aluminum, stainless steel, indium tin oxide (ITO), and fluorinated tin oxide (FTO). The thickness of the electrode layer 302 may be less than a skin depth with respect to the visible light frequency range.

The skin depth is a measure of how closely electric current flows along a surface to which an electromagnetic wave is applied. The skin depth included herein has the same meaning as a skin depth well-known in the art. In the case in which the catalyst layer 303 is attached to the internal to the headlamp to face a light source, if the thickness of the electrode layer 302 is greater than the skin depth, the region of the electrode layer 302 that does not react to visible light increases, and consequently transmittance decreases.

The catalyst layer 303 may be made of at least one selected from the group consisting of nickel, nickel oxide, nickel sulfide, nickel-copper phosphide, platinum, iridium, and rubidium. However, the present invention is not limited thereto. The catalyst layer 303 may be formed to have an excellent hydrogen-generating effect or oxygen-generating effect.

The thickness of the catalyst layer 303 may be greater than 150 nm and less than 5 µm. In the case in which the thickness of the catalyst layer 303 is 150 nm or less, the durability of the water decomposition device is lowered. In the case in which the thickness of the catalyst layer 303 is 5 µm or more, the flexibility of the water decomposition device is lowered, and thus cracking may occur when the water decomposition device is attached to the curved surface of the headlamp.

Figure 4:
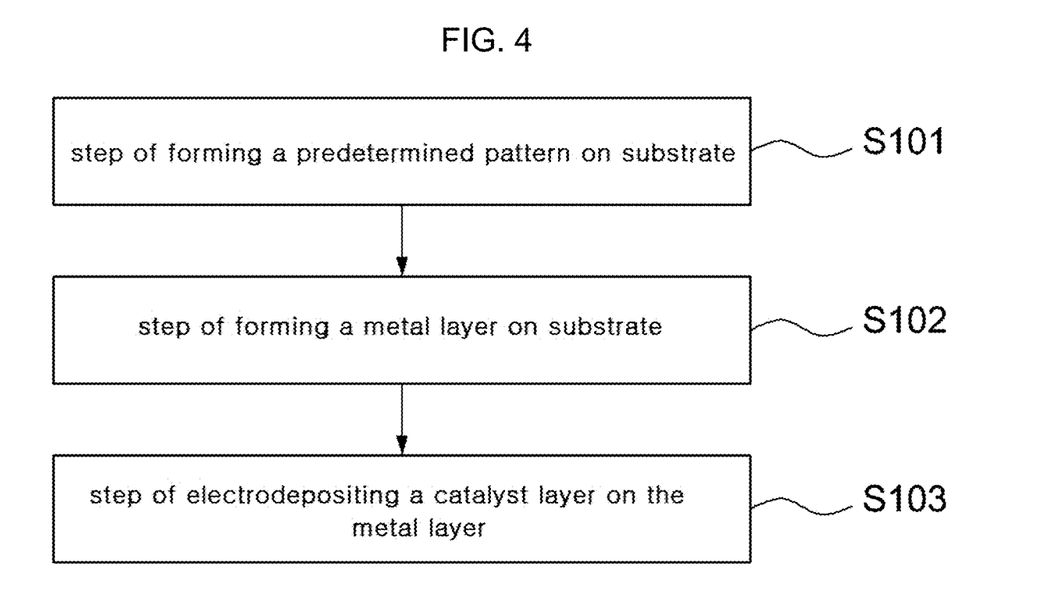
FIG. 4 is a view showing a method of manufacturing the water decomposition device of the present invention.

FIG. 4 is a view showing a method of manufacturing the water decomposition device of the present invention. Referring to FIG. 4, the method of manufacturing the water decomposition device includes a step of forming a predetermined pattern on at least one of a first substrate or a second substrate using photoresist lithography or nanoimprint lithography (S101), a step of forming a metal layer (an electrode layer) on at least one of the first substrate or the second substrate, which has the pattern thereon (S102), and a step of electrodepositing a catalyst layer on the metal layer (S103).

At the instant time, the photoresist lithography may be performed using one method selected from positive photoresist lithography and negative photoresist lithography, without being limited to either specific method. The deposition of the metal layer may be performed using sputtering or electron beam evaporation.

The manufacturing method may further include a step of performing hydrophilic surface treatment on the metal layer before electrodepositing the catalyst layer thereon. The hydrophilic surface treatment may be an ultraviolet-ozone cleaning treatment. The hydrophilic surface treatment may increase bonding force between the surface of the substrate and a deposition aqueous solution including a precursor, and may prevent bubbles from being generated on the surface of the substrate during the electrodeposition by performing surface modification, i.e. forming a hydroxyl group (—OH). However, the hydrophilic surface treatment is not limited thereto. Surface treatment using plasma may also be performed.

The manufacturing method may further include a step of performing an ultraviolet-ozone cleaning treatment on the water decomposition device after the electrodeposition of the catalyst layer.

The predetermined pattern may be the same as the pattern shown in FIG. 1. That is, a first external line and at least one first internal line formed integrally with the first external line are formed on the first substrate, and a second external line and at least one second internal line formed integrally with the second external line are formed on the second substrate. The first external line and the second external line face each other, and the first internal line and the second internal line are disposed alternately in a direction perpendicular to the longitudinal direction thereof.

The interval between the first internal line and the second internal line may be 10 to 500 µm. A predetermined interval may be formed between the first external line and the second internal line or between the second external line and the first internal line, and the present interval may preferably be 10 to 500 µm.

At least one hole may be formed in the first external line, the first internal line, the second external line, or the second internal line at the time of pattern formation, and the hole may have a circular shape. The diameter of the hole may be 80 to 95% of the width of the line. In the case in which the hole has a regular polygonal shape, the regular-polygonal hole may be formed to have the same area as the circular hole. At least two holes may be formed in a single line, and the centers of the holes may be aligned with the center of the width of the line. In the case in which the diameters of the holes are the same as each other, the shortest distance from the center of one hole to another hole may be equal to a length equivalent to half the width of the line.

The thickness of the metal layer may be less than a skin depth with respect to the visible light frequency range, and the thickness of the catalyst layer may be greater than 150 nm and less than 5 μm.

Hereinafter, the method of manufacturing the water decomposition device of the present invention and a water decomposition device manufactured through the method will be described in detail with reference to specific examples. However, it is to be understood that these examples described below are only intended to illustrate or describe the present invention in more detail, and thus the present invention is not limited thereto.

Example 1

Polyethylene naphthalate was used to form a substrate. A first substrate was formed to have a 'U'-shaped first external line and a first internal line, and a second substrate was formed to have a 'U'-shaped second external line and a second internal line. Each of the first external line, the first internal line, the second external line and the second internal line was formed to have a width of 100 μm, and the interval between the first internal line and the second internal line was set to 100 μm. A plurality of circular holes, each having a diameter of 80 μm, was formed in each of the first external line, the second external line, the first internal line and the second internal line. The circular holes were formed such that the centers thereof were aligned with the center of the width of each of the lines, i.e., a point spaced from one side of each of the lines in the width direction thereof by 50 μm. The shortest distance from the center of one hole to another hole was set to 50 μm.

Subsequently, a nickel layer was formed on each of the first substrate and the second substrate using an electron beam evaporation apparatus. Since the skin depth of the nickel in the visible light frequency range is 25 nm, the nickel layer was formed to have a thickness of 20 nm.

Subsequently, a hydrophilic surface treatment was performed on the nickel layer formed on each of the substrates for 10 minutes at 15 to 20 mW/cm² using an ultraviolet-ozone cleaner (AC-6). Nitrogen gas was purged in a deposition aqueous solution including a nickel precursor and a phosphorus precursor for 20 minutes, and a nickel phosphide catalyst layer having a thickness of 200 nm was formed on the nickel layer using an electroplating apparatus.

Accordingly, the first external line and the first internal line become a first external electrode and a first internal electrode of a hydrogen-generating electrode, respectively. The second external line and the second internal line become a second external electrode and a second internal electrode of an oxygen-generating electrode, respectively.

Comparative Example 1

A water decomposition device was manufactured in the same manner as in the above Example 1, except that a nickel phosphide catalyst layer was formed to have a thickness of 150 nm.

Comparative Example 2

A water decomposition device was manufactured in the same manner as in the above Example 1, except that a nickel phosphide catalyst layer was formed to have a thickness of 5 μm.

Figure 5:
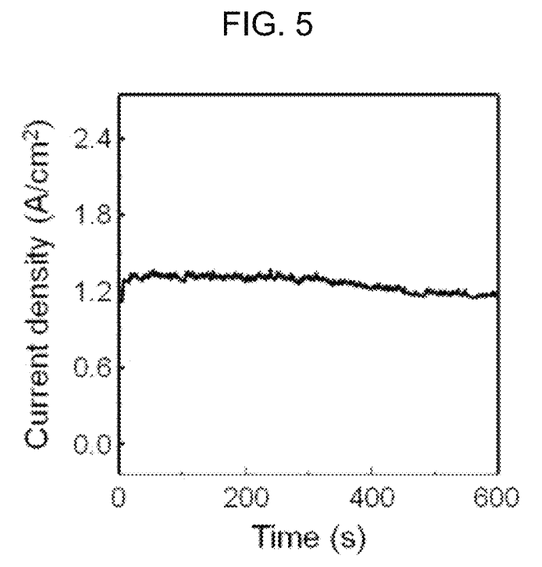
FIG. 5 is a graph showing current density measured over time after a water decomposition device of Example 1 of the present invention is immersed in a neutral solution (pH=7) and 10 V is applied thereto.

FIG. 5 is a graph showing current density measured over time after the water decomposition device of Example 1 of the present invention is immersed in a neutral solution (pH=7) and 10 V is applied thereto. Referring to FIG. 5, Example 1 has a constant current density over time, and a current density is about 1.27 A/cm². When converted into the amount of water to be removed per hour, it means that 0.1 to 0.2 ml of water may be removed per hour.

Figure 6:
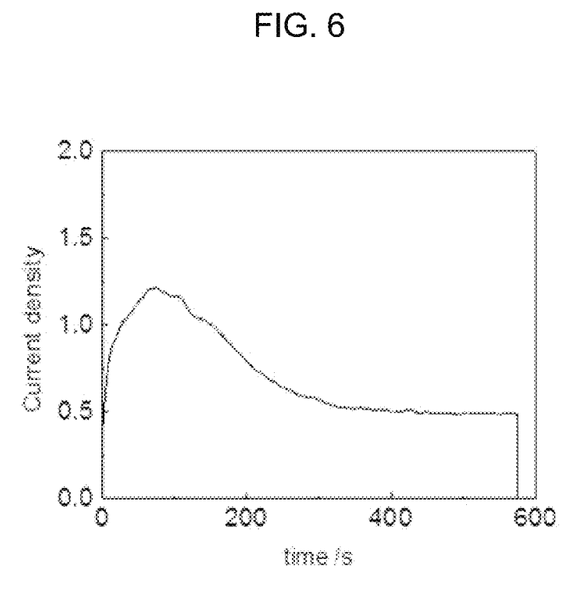
FIG. 6 is a graph showing current density measured over time after a water decomposition device of Comparative Example 1 of the present invention is immersed in a neutral solution (pH=7) and 10 V is applied thereto.

FIG. 6 is a graph showing current density measured over time after the water decomposition device of Comparative Example 1 of the present invention is immersed in a neutral solution (pH=7) and 10 V is applied thereto. Referring to FIG. 6, it may be seen that the current density reaches about 1.25 A/cm² about 80 seconds after the application of the potential, and thereafter the current density decreases. That is, it may be seen that the device of Comparative Example 1 deteriorates in characteristics or durability compared to the device of Example 1.

Figure 7:
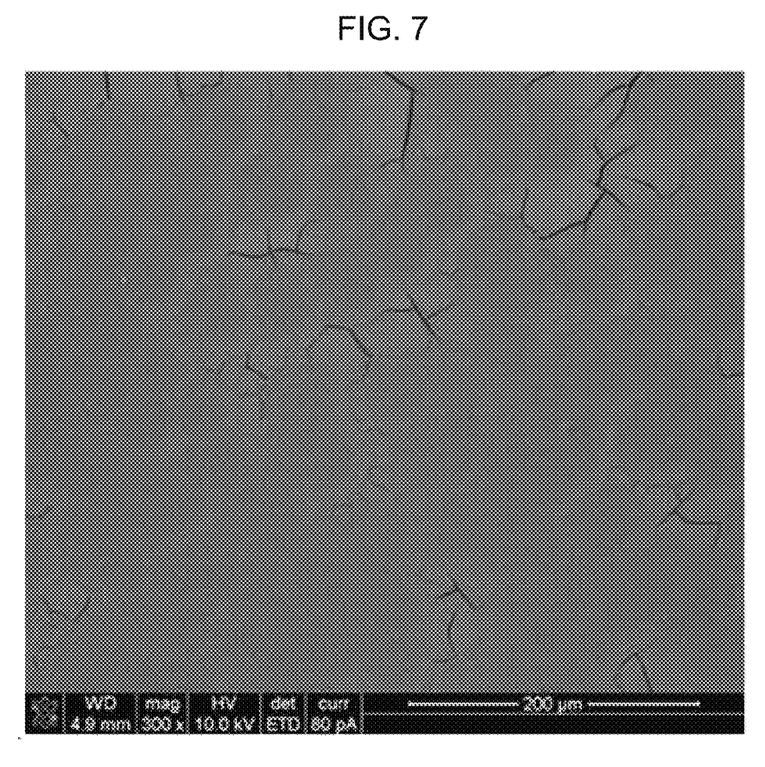
FIG. 7 is an SEM picture of a water decomposition device of Comparative Example 2 of the present invention taken by a scanning electron microscope (SEM) after being attached to a curved surface of a headlamp and then detached therefrom.

FIG. 7 is an SEM picture of the device of Comparative Example 2 of the present invention taken by a scanning electron microscope (SEM) after being attached to a curved surface of a headlamp and then detached therefrom. Referring to FIG. 7, it may be seen that the flexibility of the device is lowered and thus cracking occurs.

Figure 8A:
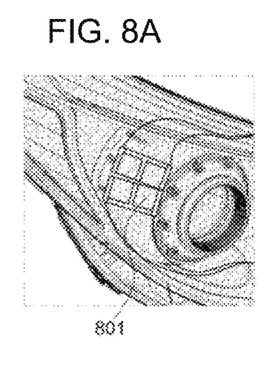
FIG. 8A shows the state in which the internal to a headlamp is humid before the device of Example 1 is operated.
Figures 8B, 8C:
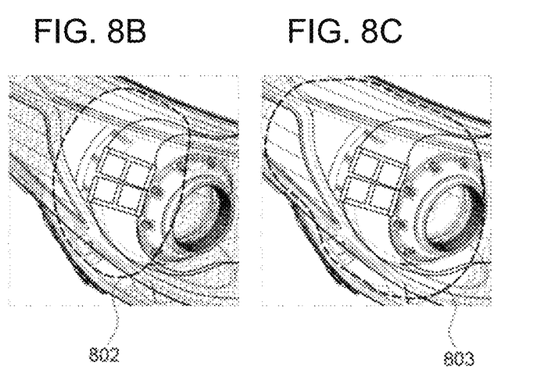
FIG. 8B shows a dehumidified region 5 minutes after the start of operation of the device of Example 1 using the power of a vehicle.
FIG. 8C shows a dehumidified region 10 minutes after the start of operation of the device of Example 1 using the power of a vehicle.
Figure 9:
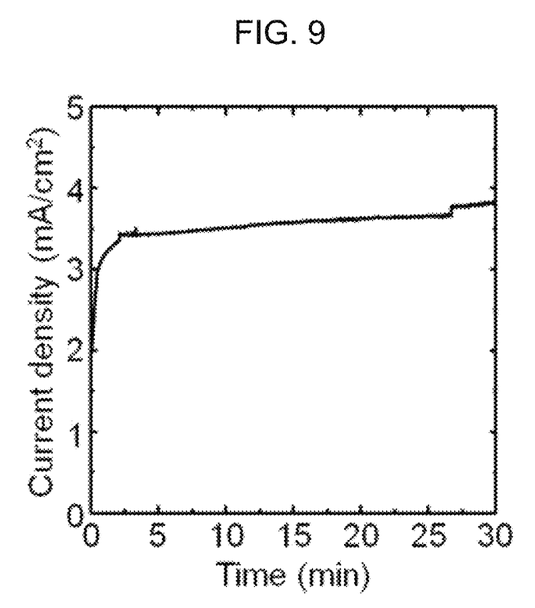
FIG. 9 is a graph showing the current density measured when the power of a vehicle is applied to the device of Example 1.

FIG. 8A shows the state in which the internal to a headlamp is humid before the device of Example 1 is operated, FIG. 8B shows a dehumidified region 5 minutes after the start of operation of the device of Example 1 using the power of a vehicle, and FIG. 8C shows a dehumidified region 10 minutes after the start of operation of the device of Example 1 using the power of a vehicle. FIG. 9 is a graph showing the current density which is measured when the power of a vehicle is applied to the device of Example 1.

Referring to FIGS. 8A to 9, when the device 801 of Example 1 is operated for 5 minutes, moisture is removed from a region 802 around the device 801 of Example 1, and when the device 801 of Example 1 is operated for 10 minutes, moisture is removed from a larger region 803. It may be seen that with the passage of the operation time of the device 801 of Example 1, a dehumidified region is expanded from the point corresponding to the center of the device 801 of Example 1 toward the rear and front end portions of the headlamp. Furthermore, the current density of Example 1 is about 3.57 mA/cm², and it can therefore be understood that moisture is effectively removed at room temperature.

Figure 10:
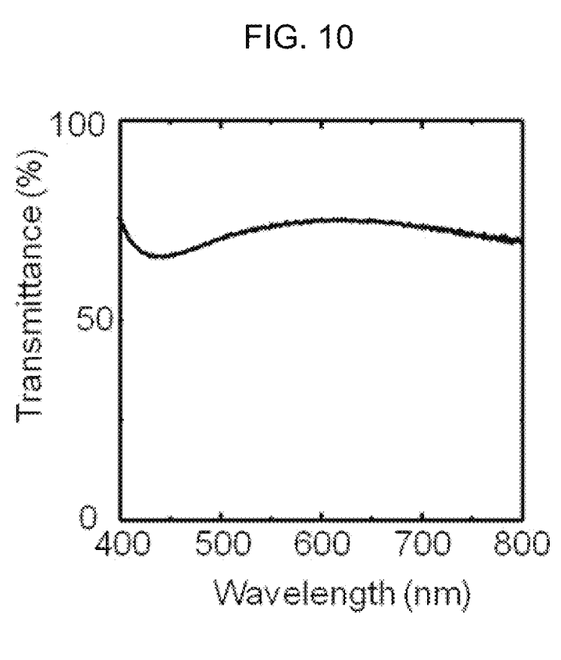
FIG. 10 is a graph showing the transmittance of Example 1 of the present invention in the visible light range.

FIG. 10 is a graph showing the transmittance of Example 1 of the present invention in the visible light range. The transmittance was measured by radiating light within the visible light range to the device of Example 1 using a UV-Vis-NIR spectrometer, detecting the light, having penetrated the device, using a detector located at an opposite side, and comparing the intensities of light before and after the penetration of light.

Referring to FIG. 10, the device of Example 1 has an average transmittance of about 79% with respect to the entire visible light range, and has a minimum transmittance of about 75% with respect to a wavelength range of about 400 nm to about 450 nm. When the water decomposition device is attached to the headlamp, the required transmittance of the device is about 70%. Thus, it may be seen that Example 1 exhibits excellent transmittance.

As is apparent from the above description, various aspects of the present invention are directed to providing a water decomposition device which may secure both transparency and durability even when an opaque material is used therefor.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A water decomposition device comprising:
   a hydrogen-generating electrode including a first external electrode and at least one first internal electrode formed integrally with the first external electrode; and
   an oxygen-generating electrode including a second external electrode and at least one second internal electrode formed integrally with the second external electrode,
   wherein the first external electrode and the second external electrode are disposed to face each other,
   wherein the at least one first internal electrode and the at least one second internal electrode are disposed alternately in a direction perpendicular to a longitudinal direction thereof,
   wherein at least one of the first external electrode, the at least one first internal electrode, the second external electrode or the at least one second internal electrode has at least one hole formed therein,
   wherein the at least one hole is a circular hole, and
   wherein the at least one hole has a diameter which is 80 to 95% of a width of a corresponding one of the first external electrode, the at least one first internal electrode, the second external electrode and the at least one second internal electrode.

2. The water decomposition device according to claim 1, wherein the at least one first internal electrode and the at least one second internal electrode are spaced from each other in a predetermined interval of 10 to 500 µm.

3. The water decomposition device according to claim 1, wherein each of the first external electrode, the at least one first internal electrode, the second external electrode and the at least one second internal electrode has a width of 100 µm or less.

4. The water decomposition device according to claim 1, wherein a diameter of the at least one hole is 80 to 95 µm.

5. The water decomposition device according to claim 1,
   wherein the at least one hole includes a hole having a regular polygonal shape, and
   wherein the hole having the regular polygonal shape has a same area as the circular hole.

6. The water decomposition device according to claim 1, wherein the at least one hole formed in a corresponding one of the first external electrode, the at least one first internal electrode, the second external electrode and the at least one second internal electrode includes at least two holes.

7. The water decomposition device according to claim 6, wherein the at least two holes are formed such that each center thereof is aligned with a center of a width of a corresponding one of the first external electrode, the at least one first internal electrode, the second external electrode and the at least one second internal electrode.

8. The water decomposition device according to claim 7, wherein, when the at least two holes have a same diameter as each other, a shortest distance from a center of one hole to another hole of the at least two holes is equal to a length equivalent to half the width of the corresponding one of the first external electrode, the at least one first internal electrode, the second external electrode and the at least one second internal electrode.

9. The water decomposition device according to claim 8, wherein the shortest distance is 50 µm or less.

10. The water decomposition device according to claim 1, wherein at least one of the hydrogen-generating electrode or the oxygen-generating electrode includes:
    a substrate;
    an electrode layer formed on a surface of the substrate; and
    a catalyst layer electrodeposited on a surface of the electrode layer.

11. The water decomposition device according to claim 10, wherein the substrate is made of at least one selected from the group consisting of polyethylene terephthalate, polyethylene naphthalate, and polydimethylsiloxane.

12. The water decomposition device according to claim 10, wherein the electrode layer is made of at least one selected from the group consisting of nickel, titanium, copper, iron, aluminum, stainless steel, indium tin oxide (ITO), and fluorinated tin oxide (FTO).

13. The water decomposition device according to claim 12, wherein the electrode layer has a thickness which is less than a skin depth with respect to a visible light frequency range.

14. The water decomposition device according to claim 10, wherein the catalyst layer is made of at least one selected from the group consisting of nickel, nickel oxide, nickel sulfide, nickel-copper phosphide, platinum, iridium, and rubidium.

15. The water decomposition device according to claim 14, wherein the catalyst layer has a thickness which is greater than 150 nm and less than 5 µm.

16. A method of manufacturing a water decomposition device, the method comprising:
    forming a predetermined pattern on at least one of a first substrate or a second substrate using one of photoresist lithography and nanoimprint lithography;
    forming a metal layer on a surface of the at least one of the first substrate or the second substrate that has the pattern thereon; and
    electrodepositing a catalyst layer on a surface of the metal layer.

17. The method according to claim 16, wherein the predetermined pattern includes:
    a first external line and at least one first internal line formed integrally with the first external line, the first external line and the first internal line being formed on the first substrate; and
    a second external line and at least one second internal line formed integrally with the second external line, the second external line and the second internal line being formed on the second substrate,
    wherein the first external line and the second external line face each other, and the first internal line and the second internal line are disposed alternately in a direction perpendicular to a longitudinal direction thereof.

18. The method according to claim 17, wherein the first internal line and the second internal line are spaced from each other in a predetermined interval of 10 to 500 μm.

19. The method according to claim 17, wherein at least one of the first external line, the first internal line, the second external line or the second internal line has at least one hole formed therein.

20. The method according to claim 19, wherein the at least one hole has a circular shape.

21. The method according to claim 20, wherein the at least one hole has a diameter which is 80 to 95% of a width of a corresponding one of the first external line, the first internal line, the second external line and the second internal line.

22. The method according to claim 21,
wherein the at least one hole includes a hole having a regular polygonal shape, and
wherein the hole having the regular polygonal shape has a same area as the circular hole.

23. The method according to claim 19, wherein the at least one hole formed in a corresponding one of the first external line, the first internal line, the second external line and the second internal line includes at least two holes.

24. The method according to claim 23, wherein the at least two hole are formed such that each center thereof is aligned with a center of a width of a corresponding one of the first external line, the first internal line, the second external line and the second internal line.

25. The method according to claim 24, wherein, when the at least two hole has a same diameter as each other, a shortest distance from a center of one hole to another hole of the at least two hole is equal to a length equivalent to half the width of the corresponding one of the first external line, the first internal line, the second external line and the second internal line.

26. The method according to claim 16, wherein the metal layer has a thickness which is less than a skin depth with respect to a visible light frequency range.

27. The method according to claim 16, wherein the catalyst layer has a thickness which is greater than 150 nm and less than 5 μm.

* * * * *